May 5, 1970 T. R. SYKES 3,509,685
BUNDLING APPARATUS

Filed Nov. 13, 1961 8 Sheets-Sheet 1

Inventor
THOMAS R. SYKES
by: 
                    Attorney

May 5, 1970 T. R. SYKES 3,509,685
BUNDLING APPARATUS
Filed Nov. 13, 1961 8 Sheets-Sheet 2

Inventor
THOMAS R. SYKES
by: [signature]
Attorney

May 5, 1970     T. R. SYKES     3,509,685

BUNDLING APPARATUS

Filed Nov. 13, 1961     8 Sheets-Sheet 3

Inventor
THOMAS R. SYKES by: *Douglas S. Johnson*

Attorney

May 5, 1970  T. R. SYKES  3,509,685

BUNDLING APPARATUS

Filed Nov. 13, 1961  8 Sheets-Sheet 4

Inventor
THOMAS R. SYKES by: *Douglas S. Johnson*

Attorney

May 5, 1970   T. R. SYKES   3,509,685
BUNDLING APPARATUS
Filed Nov. 13, 1961   8 Sheets-Sheet 5

FIG. 7

Inventor
THOMAS R. SYKES by: *[signature]*
Attorney

Inventor
THOMAS R. SYKES by: *Douglas S. Joh*
Attorney

Inventor
THOMAS R. SYKES

Inventor
THOMAS R. SYKES
by: Douglas S. Johnson
Attorney

United States Patent Office 3,509,685
Patented May 5, 1970

3,509,685
BUNDLING APPARATUS
Thomas R. Sykes, Toronto, Ontario, Canada, assignor to Toronto Star Limited
Filed Nov. 13, 1961, Ser. No. 151,943
The portion of the term of the patent subsequent to May 5, 1981, has been disclaimed
Int. Cl. B65b 57/20, 63/04
U.S. Cl. 53—55    42 Claims This invention relates to a machine for rolling sheet material such as newspapers, magazines and the like into bundles convenient for subsequent storage, handling or distribution.

There are many applications where it is desirable to roll newspapers or the like, or a quantity of sheet material or a number of sheets or groups of sheets into a compact roll or bundle, which, when overwrapped, tied or otherwise fastened will facilitate subsequent handling and when a wrapper is applied will afford protection of the paper, and the wrapper forms a convenient medium for carrying the address or other mailing or distibution information. One particular application to which extensive reference will hereinafter be made, by way of example, is the rolling of one or more newspapers, or the like into a compact bundle for purposes of mailing to subscribers or for distribution to the various points of sale along the distribution routes. In this latter connection, particularly, it will be understood that the number of papers in each bundle will normally vary from bundle to bundle according to the number required at the various stores, corners, or other points of sale.

It is, therefore, the object of this invention to provide a machine which will roll one or more newspapers, magazines, or other such items or material susceptible of being rolled, into compact bundles at an extremely high rate, and which will fix the rolled bundles against release or unrolling so that they may be subsequently safely handled. More particularly, it is an object to provide an extremely high capacity machine which will simultaneously roll and wrap bundles of sheet material newspapers and the like.

Another object is to provide a high capacity bundling machine as aforesaid which will roll and wrap any given number of newspapers or thicknesses of sheet material over a wide range and will tightly roll the bundles even though the number of papers or the thicknesses of the sheet material to be bundled in each successive bundle differs over a wide range so that sequential bundles of completely random size may be rolled.

Another important object is to provide a bundling machine as aforesaid which, by virtue of its flexibility in rolling random bundle sizes, will lend itself to fully automatic control, for example, in the bundling of varying numbers of papers to be distributed to the points of sale along a paper distribution route.

In this connection, the invention envisages the automatic feeding of newspapers or the like to the bundling machine in synchronism with the bundling machine and with the number of newspapers in each group being automatically counted and fed into position ready for bundling and then bundled according to information fed to a control circuit.

Further, in connection with the capabilities of the bundling machine lending itself to automatic feed of random sheet numbers or thicknesses, the invention also envisages the automatic synchronized feed of the bundle wrapper sheet by means of such control circuit whereby the wrapper is delivered at the appropriate time following feed of the requisite number or thicknesses of sheets according to the information fed to the control circuit. In this connection the invention also envisages the selection of the appropriate wrapper size to wrap the particular size bundle for which such wrapper is designated.

It is therefore another important object of the invention to provide an automatic bundling set up to effect automatic and synchronizing paper and wrapper feed and bundling to automatically bundle any selected sequence of bundle sizes.

Again it is an important object to provide bundling apparatus which will carry out the bundling of newspapers or the like at the same time that papers and wrappers are being fed into position in preparation for the next subsequent bundle so that there will be no delay incident to the waiting for the counting out and feeding of the papers and wrapper following the bundling of a preceding bundle.

In connection with the automatic bundling aspect of the invention it is a further important object to provide a control circuit wherein a count of the papers to be bundled can be registered, for example, manually by pressing a counting key, or automatically by delivery of signals detected or scanned from an information source, for example, from a label which is or could be subsequently applied to the wrapper, such count automatically effecting subsequent paper and wrapper feed accordingly, the system enabling the bundling of a previous count to take place simultaneously with the applying of the fresh count to the circuit.

Further in this connection, it is another important object to enable such a count to be applied while a previously applied count is actually being fed in preparation for bundling and bundling of a still previous count is actually taking place to further augment bundling capacity.

In one of the preferred applications of the bundling apparatus, papers are wrapped in wrapper which is secured by a suitable adhesive or glue and it is another important object of the invention to provide sufficient bundling time to ensure setting of the adhesive without delaying or adversely affecting the high capacity rate of automatic paper and wrapper feed and bundling.

According to one aspect of the invention, one of the important features resides in providing a plurality of (at least two and preferably at least three) expansible cages on a turntable or indexing head which is adapted to transfer or index the cages between an infeed position where sheets or papers to be rolled are delivered into the cage, and a discharge or eject position where the sheets or papers rolled by the cage are ejected therefrom, the arrangement being such that the rolling of the sheets and papers delivered into a cage continues after the cage leaves the infeed position and while a subsequent cage is moving to the infeed position, whereby the sheets or papers to be rolled in successive bundles are not required to await the complete cycle of cage delivery, rolling and ejection of the sheets or papers of the preceding bundle, thereby greatly increasing the rate of bundling.

More particularly, according to the preferred form of the invention, there are at least three such expansible cages mounted on the turntable or indexing head whereby each cage having received its charge of sheets or papers to be bundled is moved or indexed to an intermediate station between the infeed and eject stations so that rolling can continue to form a compact bundle while a subsequent cage is being charged and the bundle of a preceding cage is being ejected.

In this connection, the cages are each adapted to receive a plurality of papers fed thereto in sequential overlapped relation and to roll such papers into a rolled bundle form, the expansibility of the cage accommodating the increasing bundle diameter as the successive overlapped papers are fed thereto and added to the bundle roll. In the application of the invention herein illustrated, the papers are adapted to be wrapped with a wrapped sheet which is delivered into the respective cage at the infeed position and by virtue of the continued rolling action of the cage subsequent to paper and wrapper infeed the turntable or head may be turned or indexed from the infeed position prior to the rolling of the rolled papers or wrapper, which may be subsequently rolled into the completed bundle away from the infeed position to thus further cut down the interval between subsequent cage infeeds.

Further, it is a feature of the invention, by the provision of at least one intermediate station between the infeed and eject stations to provide a rolling interval for each bundle sufficiently long to enable adhesive applied to the wrapper to set prior to ejection to ensure that the wrapper does not open out on ejection.

Further, by providing an intermediate station, the bundle may be acted upon subsequent to the infeed and prior to eject. For example, a tape or other tie may be applied to the rolled bundle at the intermediate station in the case of a large bundle where it may not be desirable to rely solely on the strength of the wrapper to hold it in rolled form during subsequent handling. Also, if required, the wrapper or other banding means may actually be applied at such an intermediate station.

While the invention envisages the use of any desired construction of expansible cage to effect the rolling action, the preferred form of cage comprises an expansible roller cage in which a plurality of rollers are grouped into a generally cylindrical cage form with the rollers shiftable towards and from a central axis to provide the expensible cage action with means being provided to bias the rollers towards the axis to a "collapsed" position.

Another important feature resides in providing a drive arrangement to positively drive the rollers during expansion of the roller cage. Further, in this connection, it is a feature to drive the rollers not only while the cages occupy the various stations to which they are indexed, but also to drive the rollers while the turntable or head is moving between these stations.

Another important feature resides in rolling the papers, sheets or the like about a mandrel located generally concentrically within said cage, and providing means to drive the mandrel during rolling of the papers thereon.

Still another important feature resides in the construction and arrangement of a paper delivering means to deliver papers or the like into the expansible roller cage generally tangentially of a bundle being rolled therein and in this connection it is a feature to have the discharge of the delivery means shiftable to accommodate the increasing diameter of a bundle being rolled in the cage. Further, in this connection another feature resides in the construction and arrangement of the discharge end of the paper delivering means whereby the delivery means assists in guiding papers previously delivered thereby into rolled form while blocking accidental paper return out of the cage.

According to another feature of the invention, means are provided to expand the expansible roller cage when in the eject station and the means to eject the rolled bundle are arranged to eject the bundle in an axial direction.

Another important feature resides in positively driving the mandrel disposed concentrically within the cage at least when the cage is located at the infeed position or station.

Again it is a feature of the invention to provide in conjunction with the paper bundling mechanism a controllable paper feeding mechanism to deliver the requisite number of papers to each expansible roller cage when in the infeed position and to interrupt paper feed when the roller cages are out of the infeed position during indexing to or towards the eject position.

In this connection, it is a further feature to provide a wrapper sheet feeding mechanism associated with the bundling mechanism and the paper feeding mechanism to deliver a wrapper sheet into each expansible roller cage preferably when in the infeed position in timed relation to follow the last paper or the like fed into the cage.

As the wrapper is held in bundle encircling position by means of a suitable glue or adhesive according to the embodiment of the invention illustrated, it is a further feature to provide in association with the wrapper feeding mechanisms means for applying glue or adhesive at an appropriate point to the wrapper.

Again, according to the invention, the bundling mechanism lends itself to automatic control in synchronism with such paper and wrapper feeding mechanisms and another important feature of the invention resides in providing a control circuit in conjunction with such mechanism which control circuit will automatically control the sheet or paper and wrapper feed, rolling, wrapping and ejection of bundles of papers of different numbers or sheets of different thicknesses according to any desired random sequence of numbers of papers or sheet thicknesses.

In this connection, an important feature of the invention resides in incorporating at least two memory circuits in the control circuit, the one to receive and store a count of papers or the like while the other controls the operation of the wrapper feeding, paper feeding and bundling mechanisms in accordance with a count previously stored thereby. Thus the invention through the use of multiple memory circuits in conjunction with the aforesaid mechanisms enables a plurality of operations to be carried out in parallel or simultaneously rather than sequentially to greatly increase the rate of bundling.

For instance, the count impressed on the memory circuits may be manually applied through a keyboard and with the two memory circuits an operator may impress the requisite count for a subsequent bundle on the second memory circuit while simultaneously the count of a preceding bundle previously impressed on the first memory circuit is effecting the paper and wrapper feed and the bundling machine operation whereby full advantage may be taken of the maximum capabilities of the mutistation rolling operation of the bundling machine.

In wrapping each bundle as provided for by the invention, the wrapper sheet follows sequentially the final paper or papers of the sequentially delivered overlapped papers into the expansible cage and this requires that the wrapper sheet be in a position ready to follow the paper or groups of papers regardless of their number and to accommodate these random time intervals of paper feed caused by the varying numbers of papers from bundle to bundle, it is another feature of the invention to prepare the wrappers for feed into the bundling cage in response to a signal controlled by the paper by advancing the wrapper to a waiting or storage station immediately adjacent to the paper feeding mechanism. As the wrapping operation also involves the application of glue to the wrapper prior to feed into the rolling cage, a further feature resides in providing means for applying the glue or adhesive to the wrapper when the wrapper is at the waiting or storage station.

In this connection, it will be understood that the provision of the multiple memory circuits enables the feed of a wrapper for the papers of a previous count through to the waiting and gluing station to occur simultaneously with the impressing of a subsequent count and simultaneously with the bundling of a still preceding count.

While for sake of simplicity, the invention is herein described and illustrated as having the counts impressed on the memory circuit provided on a keyboard and having a single size wrapper for bundling each bundle, it will be understood that the invention may be applied to more complex arrangements. For instance, a wrapper feeding mechanism which will cut individual wrappers to the appropriate minimum size for each bundle count to thereby save wrapping paper may be employed.

Also an automatic labelling head may be employed in association with the wrapper feed mechanism to apply a pre-addressed label which may for example bear the paper count through the use of a perforation code or other code means and a suitable detecting or scanning device for detecting the code may be employed to impress the count on the memory circuits in place of the use of the manual keyboard illustrated.

These and other objects and features will become apparent from the following detailed description taken in conjunction with the accompanying drawings in which:

FIG. 7 is a broken-away perspective view illustrating one of the expansible roller cages and infeed mechanism therefor mounted on the indexing head;

Figure 1:
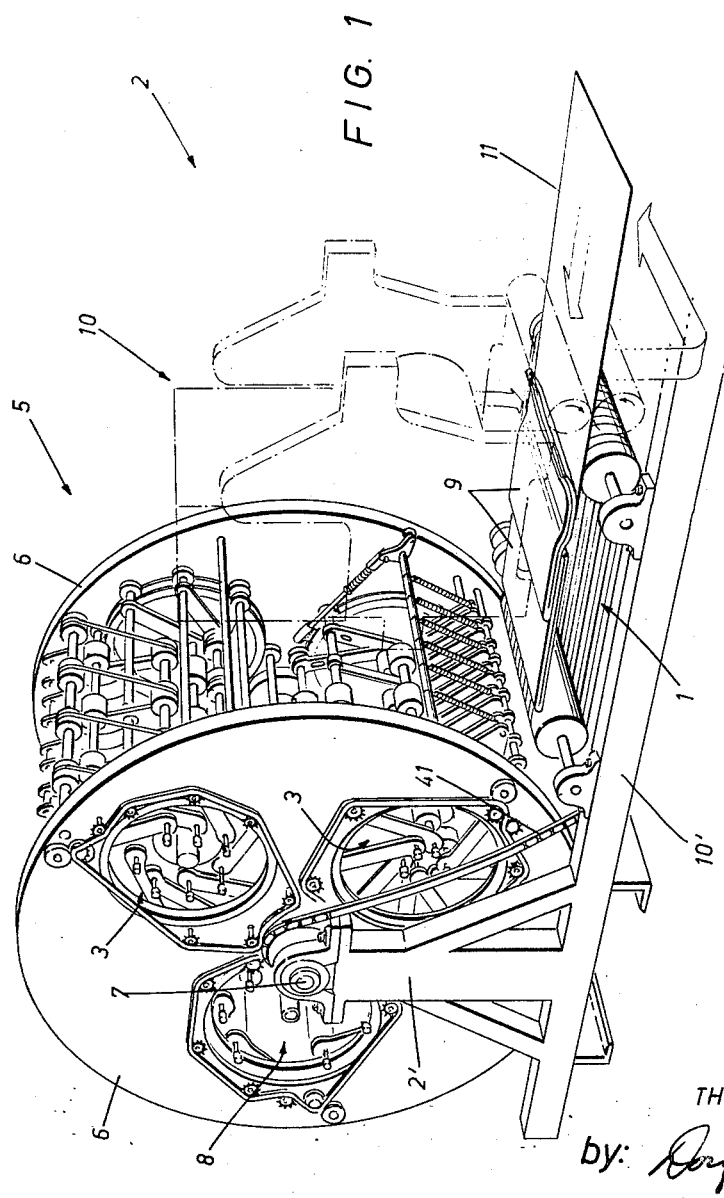
FIG. 1 is a perspective view of a bundling machine embodying the invention with the paper and wrapper feeding mechanism being omitted from the view and the flow of papers and wrappers being shown diagrammatically.

Referring first to FIG. 1, there is shown a paper or sheet feeding conveyor 1 for feeding papers, sheets or the like through a bundling mechanism 2, comprising a plurality of expansible paper or sheet rolling cages generally designated at 3, having associated therewith a paper infeeding mechanism generally designated at 4 (FIG. 8), mounted on an indexing head designated at 5 which is in the form of a drum having end flanges 6 carried on a central shaft 7 journalled in uprights 2' supported from a base 10'. The end flanges or walls 6 of the indexing head having openings 8 therein registering with the cages 3.

As will hereinafter be more fully described, the newspapers 9 or other sheet materials to be bundled may be delivered onto the conveyor 1, one at a time, with the trailing edge of each subsequent paper overlapping the leading edge of each subsequent paper as shown particularly in FIGURE 8 by means of any conventional paper feeder such as the one more or less diagrammatically illustrated at 10 in FIGURE 2, which is known in the trade as a "Sheridan" feeder.

Figure 2:
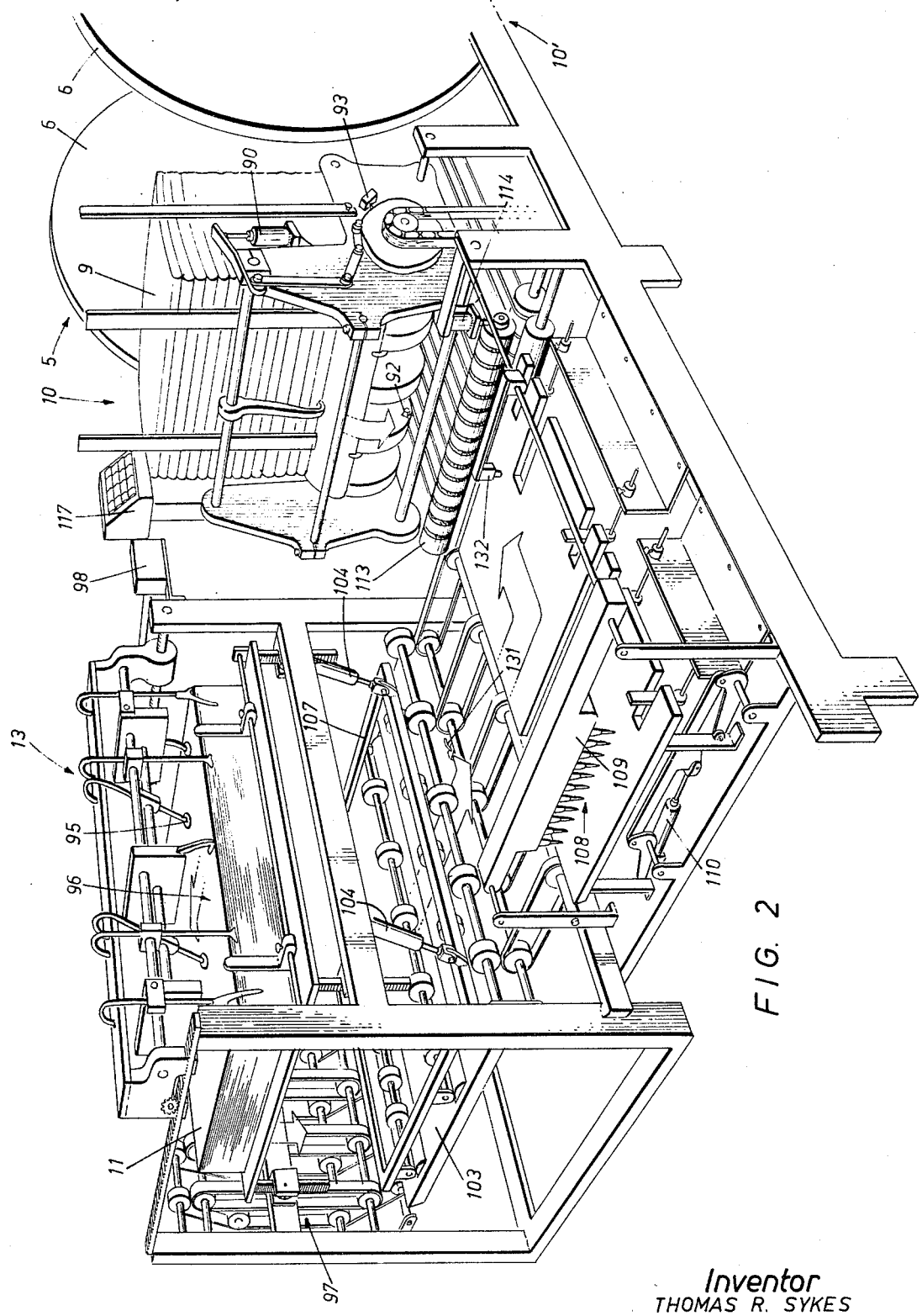
FIG. 2 is a perspective view showing a typical automatic paper and wrapper feeding set-up in conjunction with a bundling machine of the type shown in FIG. 1, the details of bundling machine being omitted from FIG. 2.

Similarly, the wrapper sheet 11 which is adapted to be rolled around the outside of the completed bundle 12 (FIG. 8), may be fed by means of any conventional sheet feeder such as the one more or less diagrammatically illustrated at 13 in FIG. 2, which is of the type manufactured by the Dexter Company.

It will be understood that in rolling a bundle of newspapers or the like, according to the invention, the requisite number of papers will be fed sequentially, one at a time into one of the expansible rolling cages 3, which in the embodiment of the invention herein illustrated comprise novel roller cages, to be rolled therein while a wrapper sheet will be fed to trail the final paper whereby upon rolling, the wrapper will encircle or enclose the paper bundle.

As the actual mechanisms 10 and 13 for feeding the paper and the wrapper sheet are old and do not per se form any part of the present invention, details of these mechanisms are omitted. However, the synchronization of such mechanisms with the bundling mechanism 2 of FIG. 1 does form part of the present invention and will be discussed in detail in connection with FIG. 10 hereinafter more fully described.

Figure 3:
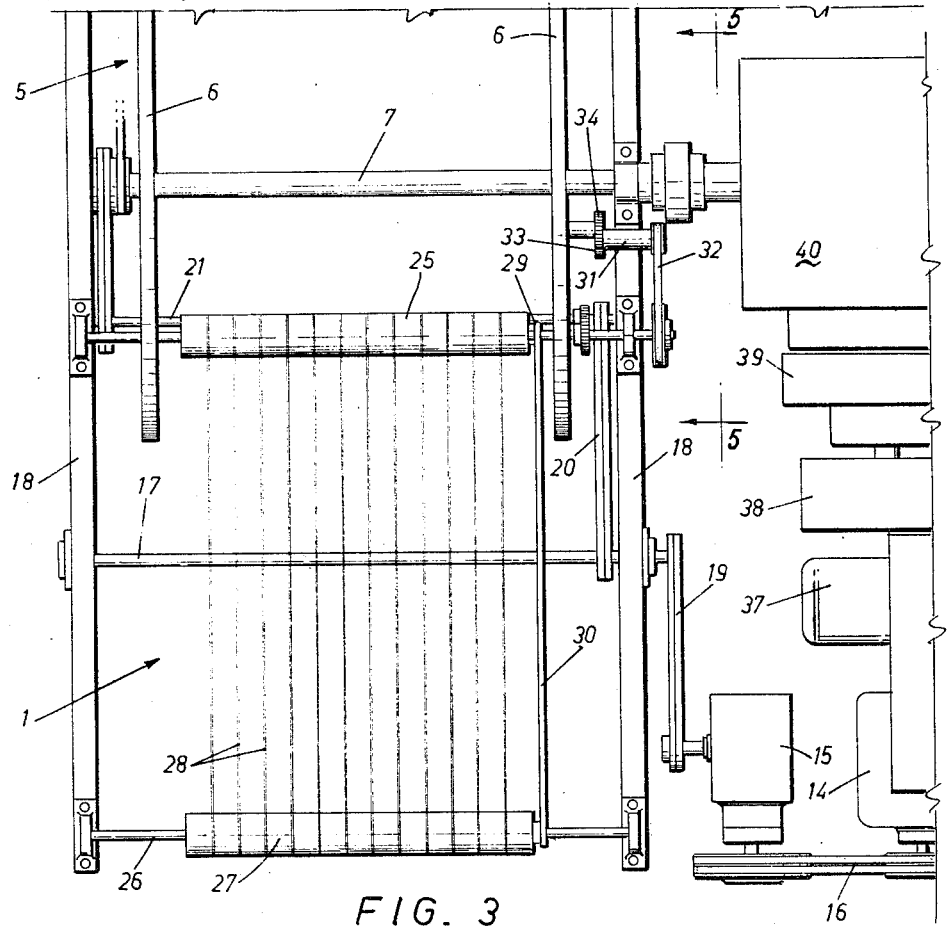
FIG. 3 is a broken-away plan view of more or less diagrammatic form omitting details of the indexing head assembly but illustrating the machine drive arrangement.
Figure 4:
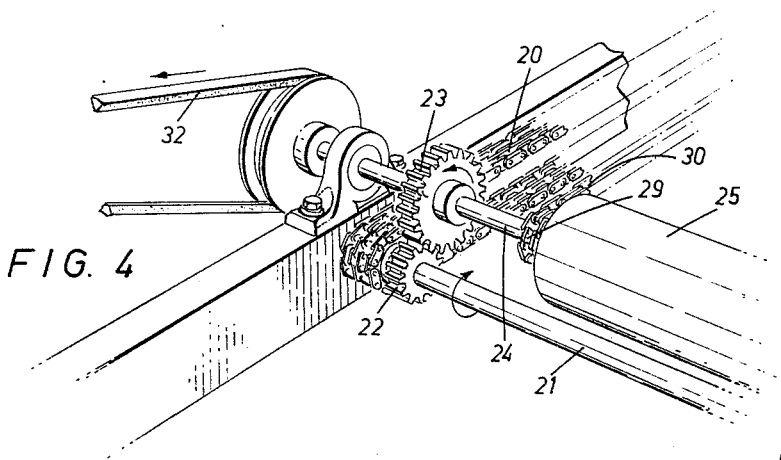
FIG. 4 is a broken-away perspective view showing the drive from the paper feeding conveyor to the drive pulley for driving the mandrel of one of the expansible roller cages when same is in the infeed index position.
Figure 5:
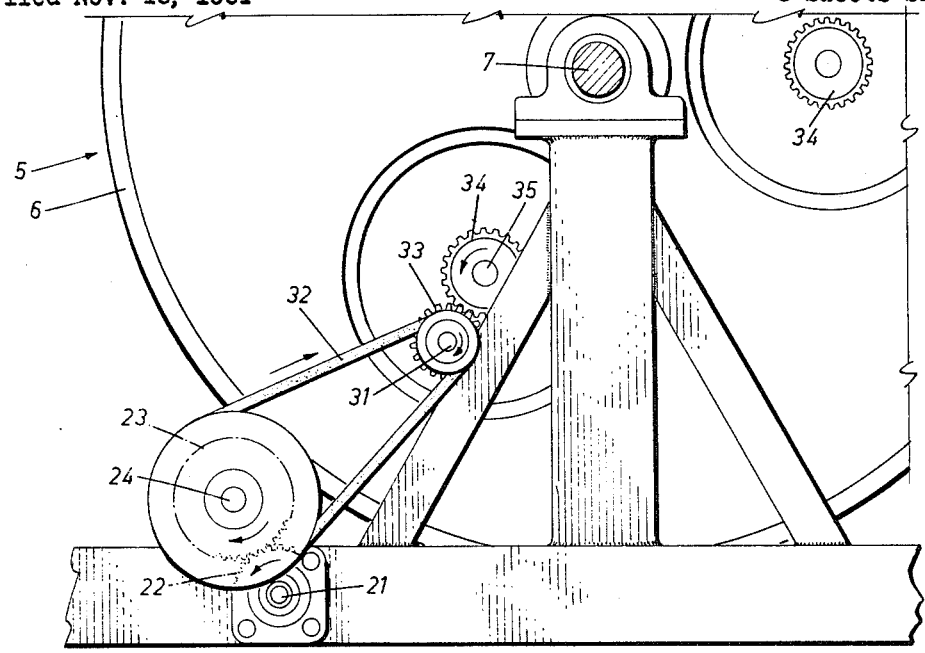
FIG. 5 is a vertical section on the line 5—5 of FIG. 3.

With reference to FIG. 3, the drive for the bundling mechanism 2 of FIG. 1 is derived from a motor 14 driving a reduction unit 15 through a belt drive 16. The reduction unit 15 in turn drives a shaft 17 journalled in side rails 18 of the paper feeding conveyor 1 through a chain drive 19. A further chain drive 20 drives a second shaft 21 carried by the rails 18 and mounted on the shaft is a pinion 22 which drives a gear 23 mounted on a shaft 24 supported in journals 25 mounted on top of the rails 18. The shaft 24 carries a roller 25 while at the opposite or forward end of the conveyor 1, a similar shaft 26 carries a similar roller 27.

Endless belts 28 extend between the rollers 25 and 27 and are adapted to carry the papers 9. An endless sprocket chain 30 also connects the shafts 24 and 26 so that same are driven in unison.

Figure 8:
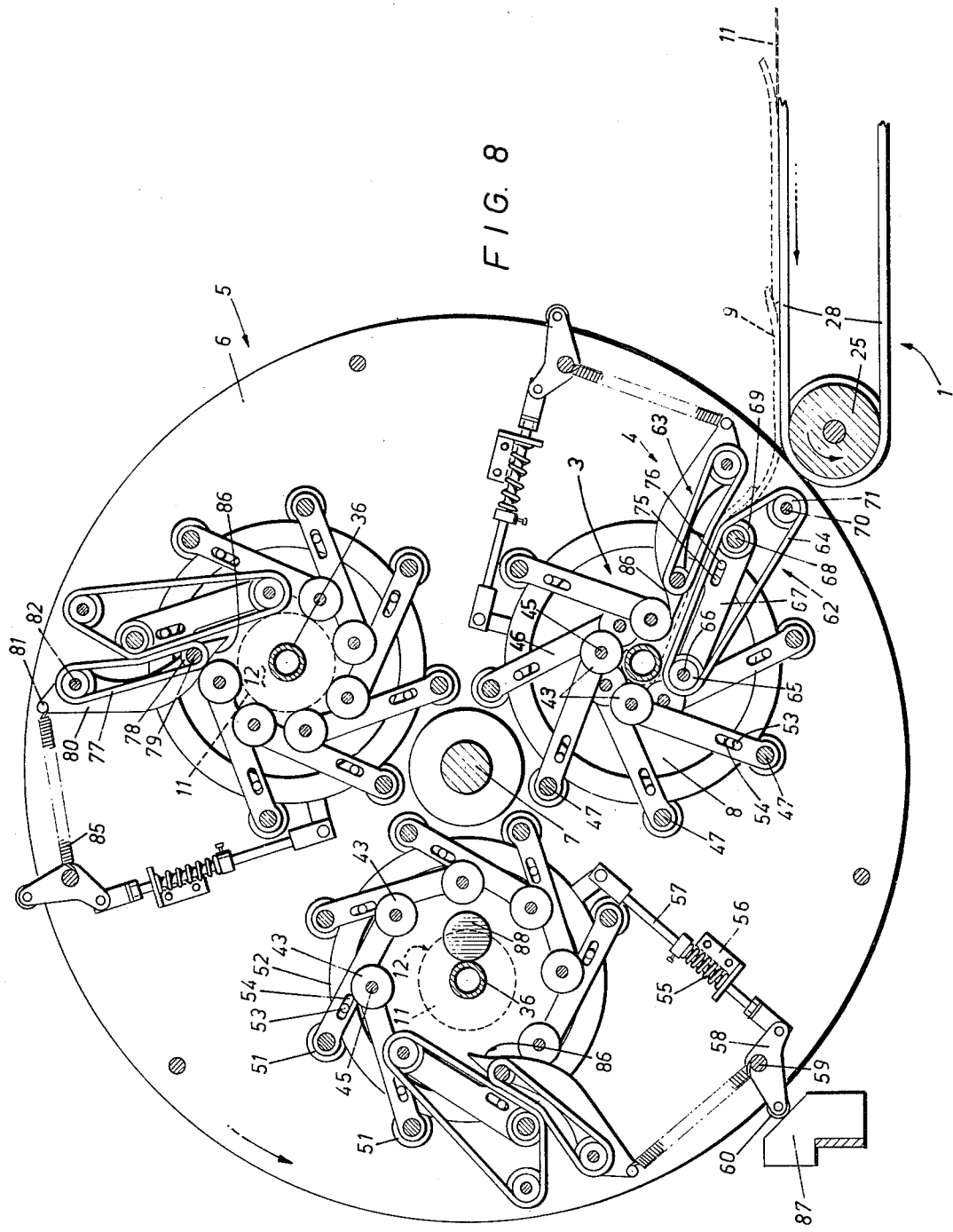
FIG. 8 is a vertical section through the indexing head assembly showing the relationship of the several expansible cage assemblies carried thereby in the different indexed positions.

The shaft 24 also drives a stud shaft 31 through a belt and pulley drive 32 and this stud shaft 31 carries a sprocket wheel 33 which is adapted to mesh with a sprocket wheel 34 fixed to a stud shaft 35 carrying a mandrel 36 associated with each of the expansible paper rolling cages 3, the sprocket wheels 33 and 34 only meshing when the indexing head has indexed such roller cage to the infeed position illustrated particularly in FIG. 8.

The motor 14 also provides indexing movement for the indexing head or drum 5 driving a speed reducer 37 through a magnetic clutch 38 and a magnetic brake 39 which drives a cam unit 40 which in the particular machine illustrated in FIG. 1 produces one-third of a revolution of the indexing head or drum on each cycle of operation. It will be understood that the drive components 37, 38, 39 and 40 are conventional units and they are shown in block form only in FIG. 3.

As shown in FIGS. 1 and 3, the shaft 21 at the opposite side of the conveyor 1 to the pinion 22 is provided with a sprocket drive 41 which drives a double sprocket 42 rotatably mounted on the central shaft 7 of the indexing drum 5 to provide a drive to the rollers 43 of the cage units 3 and to the infeed mechanism 4 through the chain drives 44 as hereinafter more fully described.

Figure 6:
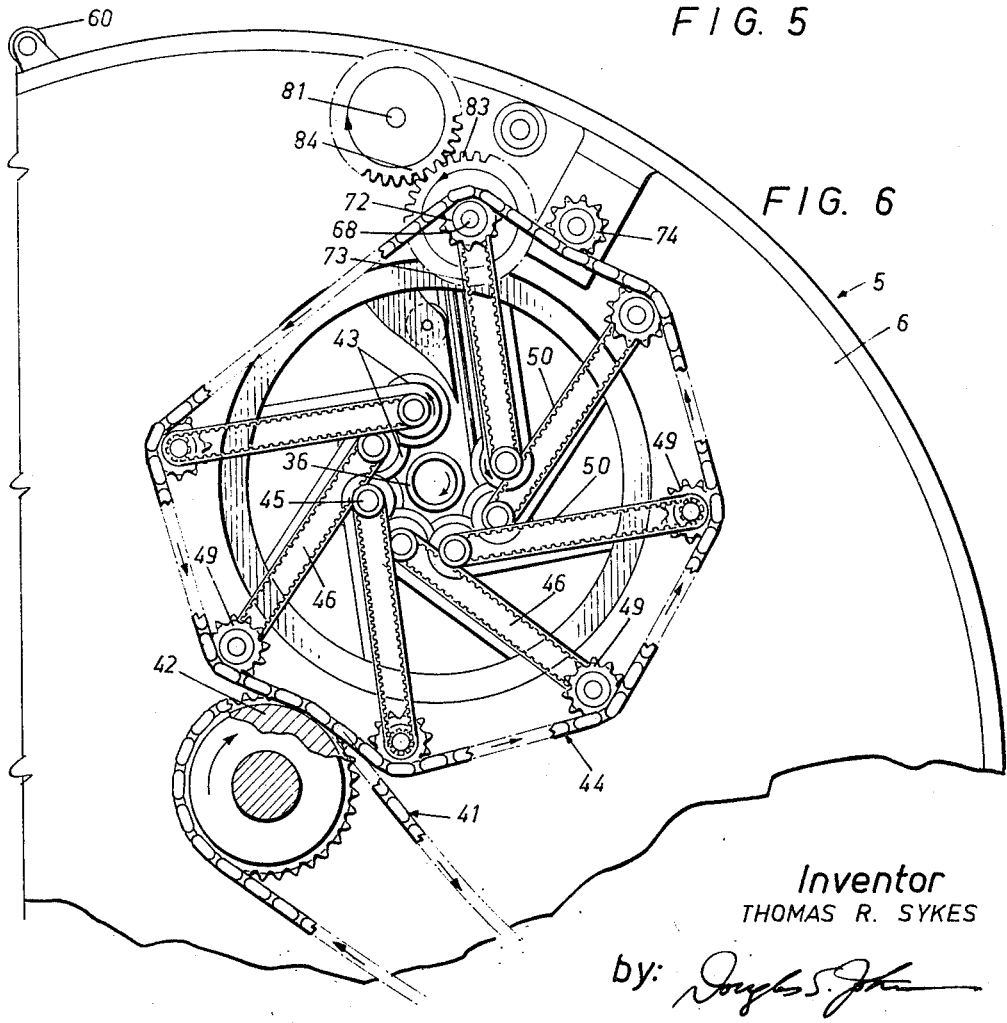
FIG. 6 is an enlarged broken-away side elevational view illustrating the drive to one of the roller cage assemblies and to the infeed mechanism for delivering papers into the cage.

The expansible roller cages 3 may best be seen in FIGS. 6, 7 and 8. As each of the roller cages is identical to the others, one only need be described.

As shown in FIG. 6, the rollers 43 of each cage are mounted on shaft 45 journalled at the free ends of arms 46 swingably mounted at the opposite ends on rods 47 carried by the drum flanges 6.

The drive to the rollers 43 is effected through the chain drive 44 which meshes with sprockets 49 carried by the rods 48 the sprockets 49 in turn effecting drive through the belt drive 50 to the roller carrying shaft 45.

As best seen in FIG. 7, the shaft 47 carries adjacent one end rollers 51 which engage in the flanged track of a cam ring 52 carrying pins 53 which engage in slots 54 in the adjacent cage arms 46 so that rotation of the cam ring will effect a swinging of the arms 46 to open and close the roller cage by moving the rollers 43 thereof towards and from the respective mandrel 36.

The cam ring 52 is urged in a direction to close the roller cages to their minimum position by means of a spring 55 acting against the bracket 56 as shown in FIG.

7 to urge rod 57 connected to the cam ring in a direction to shift the cam ring anti-clockwise as shown in FIG. 7. The upper end of the rod 57 is connected to a rocker arm 58 pivotally mounted on a cross rod 59 and carrying a roller 60. It will thus be seen that rocking of the rocker arm 58 against the action of the spring 55 will effect a clockwise movement of the cam ring 52 to shift the pins 53 in the slots 54 to open up the roller cages.

As shown particularly in FIGS. 6 and 8, each roller cage as so far described comprises the rollers 43 mounted on six shafts 45 arranged to support the rollers in a generally cylindrical grouping disposed substantially concentrically around the respective mandrel 36.

As shown in FIG. 7, in addition to the rollers 43 mounted on a shaft 45, straps 61 are bridged between the shafts 45 and 47 to provide rigidity to the roller carrying units comprised by the shafts 45, arms 46 and shafts 47 and as well to provide paper guide means as the roller cage is expanded towards its maximum open position.

The paper infeeding mechanism generally designated at 4 associated with each of the expansible roller cages 3 may also be seen in FIGS. 6, 7 and 8. This infeed mechanism comprises two endless conveyors generally designated at 62 and 63 in FIG. 8 which are urged one towards the other and are adapted to receive newspapers 9 therebetween to feed them into the respective roller cage substantially tangentially of the mandrel 39 to be rolled around the mandrel by means of the driven rollers 43 of the roller cage. The endless conveyor 62 comprises a series of endless belt or spring elements 64 passing over rollers 65 carried on a shaft 66 journalled between the free ends of arms 67 generally corresponding to the arms 46 swingably mounted on a shaft 68 which carries a second set of rollers 69 over which the endless elements 64 pass. A third shaft 70 extending between the end flanges 6 of the drum unit carries a further set of corresponding rollers 71 also engaged by the endless elements 64.

The drive to the rollers 65 and endless elements 64 is achieved through a sprocket 72 corresponding to the sprockets 49 fixed on the shaft 68 and driven from the chain drive 44. Also driven from the shaft 68 is a belt drive 73 corresponding to the belt drive 50 driving the shaft 66 carrying the roller 65.

It will be noted that since the second portion of the double sprocket 42 is required to drive the three separate chain drives 44 the engagement of the chains 44 with the sprocket 42 is at the inverse side of the chain from the sprockets 49 and 72 and only over a small portion of the sprocket circumference. An idler sprocket 74 associated with each of the chain drives 44 serves to maintain tension in the drive.

It will be seen from FIG. 8 that one of the arms 67 of the endless conveyor structure 62 is provided with a slot 75 corresponding to the slot 54 in the arms 46 and a pin 76 corresponding to the pin 53 carried by the cam ring 52 engages in the slot 75 to effect swinging of the arms 67 and rollers 65 carried thereby in conjunction with the rollers 43 in the opening and closing of the expansible roller cage.

In this connection, it will be noted that with the roller cage in the first index position ready to receive the papers 9 being delivered by the conveyor 1, that is with the roller cage in the innermost or closed position, the rollers 65 carried by the shaft 66 form part of or supplement the cylindrical grouping of rollers about the mandrel 36. At the same time it will be noted that the conveyor 62 is arranged to discharge or feed the incoming paper 4 at a point and in a direction substantially tangential to the mandrel 36 whereby the driven rollers 43 can effect the movement of the paper around the mandrel in the rolling operation. It will be apparent from FIG. 8 that as the cages are expanded under the pressure of the building up bundle or roll endless belt elements 64 and the associated rollers 65 will maintain their same relative roller cage forming relation and it will also be apparent that as the bundle or roll builds up the endless conveyor 62 will swing so that the direction of movement of the endless element 64 will always remain substantially tangential to the bundle regardless of its diameter.

The endless conveyor 63 comprises endless belt or spring elements 77 passing over rollers 78 mounted on a shaft 79 carried at the free ends of pairs of arms 80 swingably mounted on a shaft 81 journalled between the end flanges 6 of the drum unit 5. The shaft 81 carries rollers 82 corresponding to the rollers 78 and over which the endless element 77 pass. Drive to the endless conveyor 63 is effected through a sprocket 83 carried on the shaft 68 as shown in FIG. 6 which meshes with a sprocket 84 fixed to the shaft 81 carrying the rollers 82.

Springs 85 connected between the pairs of arms 80 and the rod 59 act to urge the arms 80 in a direction to bring the endless elements 77 of the conveyor 63 into contact with the endless elements 64 of the conveyor 62 so that the papers 4 delivered from the feed conveyor 1 will be gripped therebetween and fed positively into the respective roller cage.

It will be noted that the free ends of the arms 80 are of a curved formation as indicated at 86. This curved arm formation acts as a bundle or roll guide as the expansible roller cages are opened up as shown in FIG. 8. It will be understood that the action of the springs 85 will cause the conveyor unit 63 to follow the conveyor unit 62 as same is opened up as part of the roller cage by the cam ring 52.

As shown in FIG. 8, a cam 87 mounted adjacent the base of the bundling mechanism 2 is arranged to engage the roller 60 of the rocker arm 58 to open up the roller cage when the cage reaches the eject position.

Figure 9:
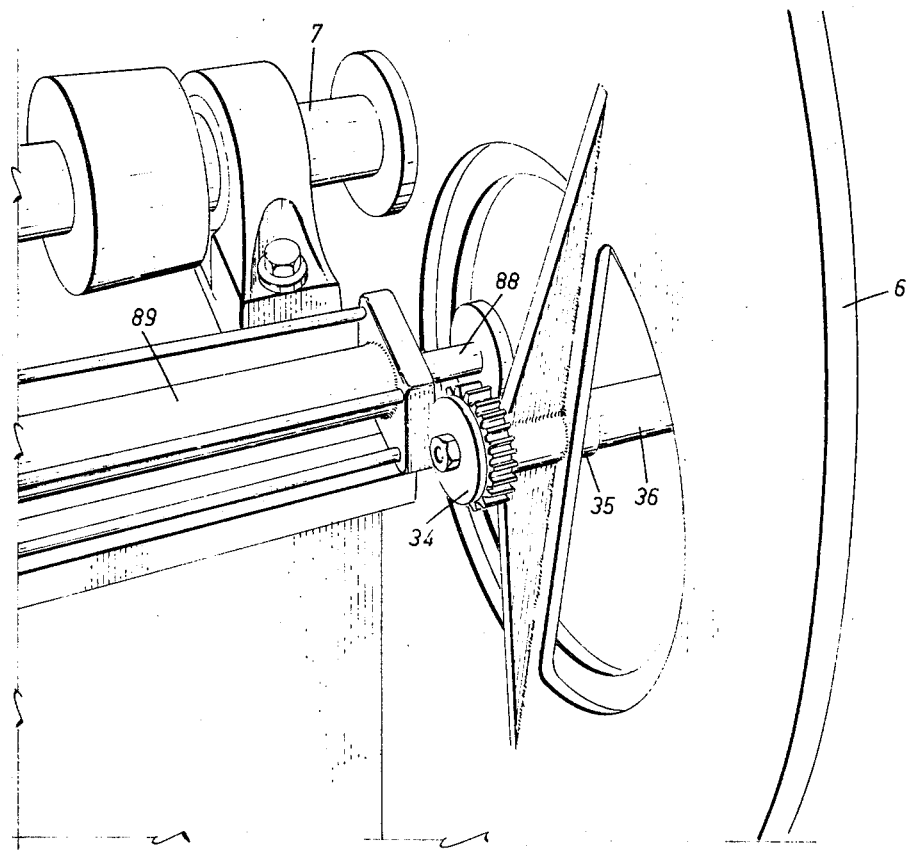
FIG. 9 is a broken-away perspective view illustrating the ejecting cylinder for ejecting rolled bundles from the expansible roller cage when the latter is indexed to the eject position.

As shown in FIG. 8 and particularly FIG. 9, there is provided an ejecting mechanism in the form of a piston 88 for stripping the roller bundle from the mandrel 36. As shown in FIG. 9, this piston is mounted in a hydraulic cylinder 89 which is synchronized to the machine operation as hereinafter more fully described so that the piston 88 will be retracted clear of the bundling unit while same is being indexed and which will be operated upon each roller cage being indexed to the final eject position and expanded by action of the cam 87 to move through the registering openings 8 against one end of the rolled bundle 12 to eject same.

FIG. 2 is a typical installation utilizing the bundle capabilities of the bundling mechanism 2 for automatic paper and wrapper feed, synchronized to the operation of the bundling mechanism. With reference to FIG. 2 and the control circuit, FIG. 10, the paper feeder, diagrammatically illustrated at 10, has associated therewith a feed controlling air cylinder 90 operated by a valve 90' controlled by a solenoid 91, which, when energized, will allow the paper feeder to feed papers. Also associated with the paper feeder is a pulse switch 92 arranged to be tripped each time the paper is fed by the unit. A cam switch 93 is also provided and closes at a time in the cycle of the paper feeder 10 when it is propitious to interrupt paper feed should a jam occur. A stop feed switch 94 is also provided in the circuit of the feed control solenoid 91.

The sheet or wrapper feeder 13, again more or less diagrammatically illustrated in FIG. 2, comprises a suction head 95 adapted to pick up the upper sheet of a stack 96 and to deliver same laterally to a conveyor 97 upon operation of an air cylinder 98, controlled through an air valve 99 by means of a solenoid 100.

Figure 10:
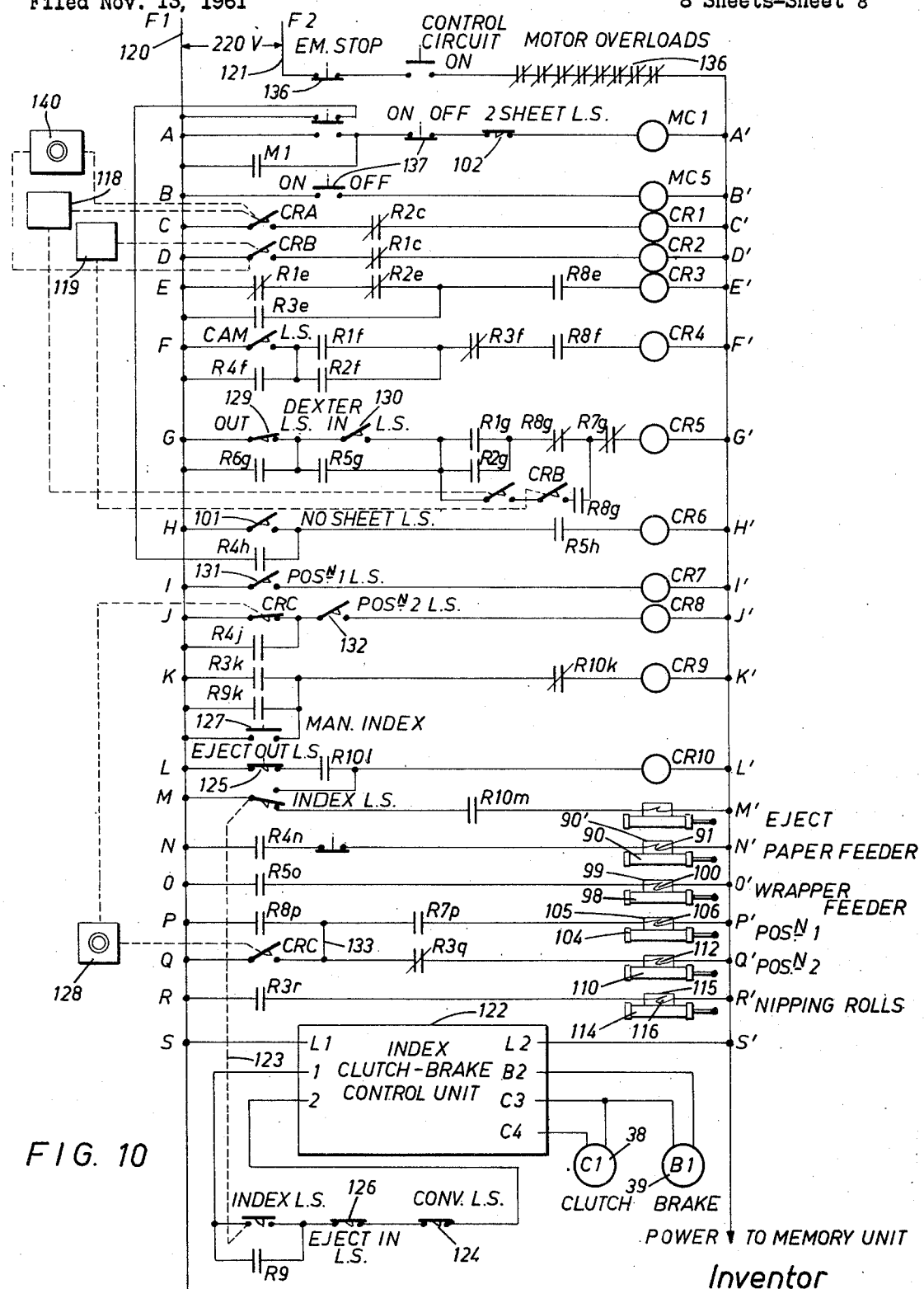
FIG. 10 is schematic wiring diagram of a control circuit for effecting automatic paper and wrapper feed and subsequent bundling in response to information fed to the circuit.

The conveyor 97 has associated therewith a "no-sheet" limit switch 101 and a "two-sheet" limit switch 102 shown in FIG. 10, arranged to control the sheet feeder in the event either the feeder fails to deliver a sheet to the conveyor or two sheets are delivered in error, to conveyor 97.

The sheet 11 fed by the conveyor 97 is delivered to a first storage position designated at 103 and, as hereinafter more fully described, if the wrapper sheet is to be halted in the first storage position 103, an air cylinder 104 is operated through an air valve 105, controlled by a solenoid 106 to lower a platform 107 to clamp the sheet.

If it is propitious to feed the sheet past the first storage position 103, it is delivered to a second storage position indicated at 108, bringing one end of the wrapper sheet beneath a glue trough 109. An air cylinder 110 when actuated by air valve 111 controlled by solenoid 112 is arranged to clamp the sheet in a second storage position 108 while glue is applied thereto. To feed the wrapper sheet out of the second storage or gluing position 108, there is provided a nipping roll 113, actuated by an air cylinder 114, controlled by a suitable air valve 115 through solenoid 116.

In the operation of the automatic bundling set-up illustrated in FIG. 2, it will be appreciated that through the use of a conventional counting circuit, an operator may, from a suitable control position such as designated at 117 in FIG. 2, punch the number of papers to be bundled at the control position to set the cycle of operation for bundling the particular number of papers punched.

The control circuit of FIG. 10 is governed by a conventional counting circuit comprising two conventional memory units 118 and 119 illustrated in block form which will allow a second count to be set up at the control position 117 on the second memory unit while the feed of the requisite number of papers and the wrapper sheet in accordance with count set up on the first memory unit is taking place. Thus the use of the two or multiple memory circuits will allow a number of simultaneous or parallel functions to take place as will hereinafter appear rather than requiring a complete paper and wrapper feed, bundling and ejection to take place before a fresh cycle of paper feed can be initiated.

As shown, the control circuit is fed from lines 120 and 121 and connected across these lines are the various circuit branches A–A', B–B', etc., S–S'.

The motor circuit for the sheet feeder 13 is represented at MC1 and the motor circuits for the bundling mechanism 2 and the paper feeder 10 are represented at MC5. The control circuit involves ten relays CR1 to CR10, the contacts of which are operated upon their energization. The contacts of relay CR1, for example, are designated with reference to the relay and with reference to the branch circuit in which the contact appears. Thus the contact of CR1 appearing in line D—D' is designated $R_{1d}$, etc. The circuit S–S' feeds a control box labelled "Index" which controls the clutch brake assembly driving the index motion of the indexing head or drum 5, that is, it controls the magnetic clutch and the magnetic brake 38 and 39 of the indexing unit. Associated with this circuit is a normally open "indexing" limit switch 123 which is tripped as the drum 5 begins to index and is released on completion of the index. Also associated with this circuit is a "conveyor" limit switch 124 which is adapted to be operated by wrappers or papers arriving on the conveyor 1 adjacent the indexing head 5. A limit switch 125 labelled "eject out L.S." is located by the ejecting cylinder 89 and is operated as the piston 88 of the cylinder reaches the "out" or extended position. A limit switch 126 labelled "eject in L.S." is operated when the ejecting cylinder piston 88 is in the "in" or retracted position. A "manual" indexing switch 127 is provided so that the indexing head 5 can be manually indexed one position and the ejecting cylinder 89 made to cycle.

Also associated with the counting circuit is a "cancel" button diagrammatically shown in block form at 128 and arranged to operate switches CRC when depressed to clear the memory circuits 118 and 119 of a count.

OPERATION

When the number of papers is recorded by the memory circuit, for example 118, this circuit is arranged to operate switch CRA in line CC5 which will energize relay CR1 through the normally closed contacts $R_{2c}$ of the relay CR2. The energization of relay CR1 will open its normally closed contact $R_{1d}$ in line D–D' thereby precluding energization of relay CR2 which would be energized otherwise upon receiving a signal from the second memory unit 119. Energization of relay CR1 will also open normally closed contact $R_{1e}$ in circuit E–E' thereby preventing relay CR3 from being energized, while in circuit F–F' normally opened contact $R_{1f}$ will close preparing the paper feeding cam switch 93 for energization of the relay CR4 upon the contact $R_{8f}$ being energized.

With the sheet feeder 13 in its start position the closing of the normally opened contact $R_{1g}$ in circuit G–G' will energize relay CR5 through the normally closed contacts $R_{8g}$ and $R_{7g}$ through normally closed paper feed or Dexter "out" limit switch 129 which remains closed until the paper feeding cylinder 98 moves to its final position to deliver the sheet to the conveyor 97 and through the paper feed or Dexter "in" limit switch 130 which is closed when the feed cylinder 98 of the paper feeder is in its start position.

Upon relay CR5 being energized its normally open contact $R_{5g}$ which bypasses the paper feeding "in" limit switch 130 will close and lock in so that after the cycle of feed of the paper feeder has started and switch 130 opens relay CR5 will remain energized. The energization of the relay CR5 will close the normally open contact $R_{5o}$ in circuit O–O' causing the feed of a wrapper sheet 11 to the conveyor past the "two-sheet" limit switch 102 and the "no-sheet" limit switch 101 with the action of the sheet passing the "no-sheet" limit switch 101 in line H–H' closing this switch thereby energizing relay CR6 through the normally closed contacts $R_{5h}$ in circuit H–H'. Energization of relay CR6 will close its normally open contact $R_{6h}$ bypassing the "no-sheet" limit switch 101, thus locking in the relay CR6. A further contact of relay CR6, $R_{6d}$ arranges to close to bypass the sheet or paper feed "out" limit switch 129 in circuit G–G', thus holding the relay CR5 energized even after the air device 98 has moved to its "out" position to open switch 129, allowing sheet 11 to travel to the first storage position 103 where it trips "position 1" limit switch 131 in line I–I' causing this switch to close and energize relay CR7.

It will be understood that if the suction head 95 of the sheet feeder 13 has failed to pick up a sheet then switch 129 would open as the air device 98 reaches the end of its feed stroke and this action would drop out relay CR5 thereby de-energizing the solenoid 100 in line O–O' causing the device 98 to return to its normal or start position and comemnce another feed stroke. This operation would continue until the sheet was delivered past the "no-sheet" limit switch 101.

If the sheet feeder is fed two sheets then the "two-sheet" limit switch 102 would be actuated and this would open the circuit to the motor MC1 in line A–A', driving the sheet conveyor, thereby interrupting sheet feed until the two sheets were cleared. The motor MC1 is protected by the usual suitable overload devices 135 and is further in series with an energizing stop switch 136 and an on-off switch 137.

When a sheet has fed to the first storage position 103 and relay CR7 in circuit I–I' is energized, relay CR5 will be de-energized by the opening of the normally closed contact $R_{7g}$ in the circuit G–G' and the sheet feeder 13 will be set for a further cycle of sheet feed.

At the same time, contacts $R_{7p}$ in circuit P–P' will close but while these contacts are in series with the solenoid 106 controlling cylinder 104, the solenoid will not be operated because series contacts $R_{8p}$ are open. Therefore, feed of the wrapper sheet will continue onto the gluing or second storage position 108. At this position, a "position two" limit switch 132 in line J–J' is closed to energize relay CR8. However, as the sheet clears switch 131 in the first storage position, relay CR7 will drop out so that at this time circuit P–P' still remains to be energized.

Energization of relay CR8 closes normally open contacts $R_{8p}$ in circuit P–P', and these contacts provide energy through a jumper 133 connecting circuit P–P' to circuit Q–Q' and normally closed contacts $R_{3q}$ in circuit Q–Q' to energize the solenoid 112 which upon energization operates cylinder 110 to clamp the sheet in the second storage position and to apply glue to one edge thereof.

At the same time, with the cam switch 93 in the paper feeder 10 closed at an appropriate point in the cycle of the feeder to allow paper feed, the energization of the relay CR8 will close normally open contacts $R_{8f}$ in circuit F–F' to energize relay CR4, with relay CR1 being still energized to close contacts $R_{1f}$. Energization of relay CR4 will close normally open contacts $R_{4n}$ in circuit N–N' to energize the paper feeding solenoid 91 to commence paper feed one at a time.

As relay CR8 is energized the normally closed contact $R_{8g}$ in circuit G–G' and the normally opened bypassing contact $R_{8g'}$ will reverse and if there is a count in each of the memory circuits 118 and 119 closing switches CRA and CRB then relay CR5 will again be energized and another wrapper sheet 11 will feed as before until it reaches the first storage position 103 where it will trip the "position 1" limit switch 131 again energizing relay CR7 which in turn, will open normally closed contacts $R_{7g}$ in circuit G–G' to drop out relay CR5 which will reset the sheet feeder 13 again. The sheet feeder will not at this time then be able to feed any more wrapper sheets until the previous sheet has been pulled from the first storage position 103.

As the second storage or gluing position 108 is occupied by the previous sheet and relay CR8 is energized, circuit P–P' will be energized to operate solenoid 106 actuating air cylinder 104 to clamp the sheet at this point.

As each paper leaves the paper feeder 10, upon energization of the circuit M–M', it closes a pulse switch 134 which feeds pulses into the counting circuit and when the number of impulses corresponds to the prepunched count, for instance, stored on the memory unit 118, this memory unit clears, releasing switch CRA so that the switch opens, thereby de-energizing relay CR1. Alternatively, if the memory unit 119 were in operation, switch CRB would be opened, dropping out relay CR2.

It will be understood that in describing the circuit operation with respect to the presence of a count on the memory circuit 118, a similar description will apply when the memory circuit 119 is in operation, closing switch CRB.

With CRA and CRB in the normally open position, de-energizing relay CR1 and CR2, the normally closed contacts $R_{1e}$ and $R_{2e}$ in circuit E–E' will energize the relay CR3 through the now closed contact $R_{8e}$ since relay CR8 is now energized. Energization of relay CR3 will, in turn, close contacts $R_{3e}$ bypassing the contacts $R_{1e}$ and $R_{2e}$, locking in relay CR3 even though switches CRA and CRB are subsequently energized, which would occur if another count were in the memory circuits, at which time, of course, relays CR1 or CR2 would immediately be re-energized.

As relay CR3 is energized, it de-energizes relay CR4 by opening the normally closed contacts $R_{3f}$ in circuit F–F'. This, in turn, will open the contacts $R_{4n}$ in circuit N–N' stopping the paper feed from the paper feeder 10.

At the same time, the solenoid 112, which has been operated to clamp the sheet in the second storage or gluing position 108, is de-energized by the opening of the normally closed contacts $R_{3q}$ in circuit Q–Q'. Upon de-energization, the wrapper sheet 11 is released while simultaneously, the solenoid 116 in line R–R' is energized through the now closed contact $R_{3r}$ to actuate the nipping roll cylinder 114 to grip the released wrapper sheet and feed it into the bundling unit 2, with the last papers of the count fed from the paper feeder 10.

Energization of relay CR3 also energizes relays CR9 through closing of the normally open contact $R_{3k}$ in circuit K–K'. Relay CR9, in turn, closes contact $R_{9k}$ bypassing contact $R_{3k}$ to lock relay CR9.

When the wrapper sheet 11 has fed far enough to clear the "position 2" limit switch 132, the switch opens, de-energizing relay CR8 and this, in turn, will de-energize the solenoid 106 in line P–P', thus releasing the sheet at the first storage position and the sheet waiting there will feed to the second storage or gluing position 108.

At the same time, relay CR3 is de-energized by opening of the contacts $R_{8e}$, which in turn, releases the nipping roll 113.

With relay CR9 now locked in, the first wrapper will move to clear the "conveyor" limit switch 124 allowing this latter switch to return to its normally closed position. The indexing head 5 is now ready to index and this occurs if the eject cylinder 89 has retracted the piston 88, so that the "eject in" limit switch 126 associated with the index circuit in line S–S' is closed, leaving the "eject out" limit switch appearing in line L–L' which is normally closed, also in the closed position. The circuit to the indexing unit 122 will thus be complete through the now closed contact $R_{9s}$ following energization of relay CR9, the "eject in" limit switch 126 and the "conveyor" limit switch 124 and the indexing head 5 will commence to index through its one-third of a revolution.

When the indexing head 5 begins to index, the "index" limit switch 123 is actuated, causing energization of the relay CR10 in line L–L' and this latter relay is locked in through the "eject out" limit switch 125 in line L—L and the now closed contact $R_{10l}$. At the same time, contacts $R_{10k}$ in the K–K' will open, dropping out relay CR9 and the index unit is now controlled through the "index" limit switch in series with the "eject in" switch 126 and the "conveyor" limit switch 124. Upon completion of the index, the "index" limit switch 123 will open, releasing the driving clutch 38 and applying the magnetic brake 39.

The "index" limit switch 123 also, on returning to its normal position, energizes line M–M' through the now closed contacts $R_{10m}$ to energize the eject cylinder solenoid 91 to cause the piston 88 to move outwardly to discharge the bundle from the roller cage located at the eject position.

As the piston 88 reaches the end of its ejection stroke, it will open "eject out" limit switch 125, thereby de-energizing relay CR10, which causes the piston 88 to retract clear of the indexing head 5 in preparation for discharge of the subsequent bundle in the next indexing cycle.

It will be understood that the operation of the control circuit will similarly follow with the closing of switch CRB in line D–D' upon receiving a signal from the memory unit 119.

Where a particular number of papers is to be bundled in successive bundles the counting circuit may include a repeat key diagrammatically designated at 140 in FIG. 10 to take over control of the memory circuits 118 and 119 and prevent the count impressed for example on the memory unit 118 from being cancelled at the end of the count so that the control circuit will continue to recycle the bundling machine to successively bundle the selected count.

With this control circuit as described, it will be understood that papers may be automatically fed in any number capable of being rolled through the bundling mechanism 4, according to a count placed in one of the memory circuits. The wrapper sheet will follow the last papers delivered by the paper feeder 10 as described above and as shown in FIG. 8, these will be rolled in the expansible roller cage 3 disposed to receive them from the conveyor 1 with the indexing head 5 at the first indexing position.

With the glue applied to the one edge of the wrapper sheet 11, this wrapper sheet upon encircling the outermost paper will adhere on itself to protect the bundle and secure same in the rolled form.

It will, of course, be understood that as soon as the papers and wrapper sheets are fed into the roller cage 3 at the first indexing position, the indexing head 5 will index through one-third of a revolution, at which time, the succeeding cage will be in a positon to roll a second bundle. In the meantime, the bundle rolled in the first cage, which is now at an intermediate position having moved through one-third of a revolution, will continue to be rolled by the driven rollers 43, which will maintain the bundle tight, and at the same time, provide sufficient time for the glue applied to the wrapper, to set. The provision of this intermediate position or station also provides for the interruption of bundle transfer for a time and at a point where it may be additionally taped or otherwise secured should the number of papers contained in the bundle be too great to be securely bound by the wrapper sheet.

When the second set of papers and wrapper are delivered to the second roller cage, then the indexing head 5 is indexed once again to bring the first roller cage to the eject position where the cam 87 will open up the cage and the ejecting cylinder meantime will be energized to eject the bundle, clearing the cage for the next index movement which will bring it back to the infeed position again. Meanwhile, the third cage will have received its papers and wrapper and will have bundled same and the second cage will have been continuing the rolling of the bundle and allowing of the adhesive to set in the intermediate index position between the infeed and the discharge stations.

In the particular control circuit the start of paper feed is delayed until the indexing of the indexing head has been completed. It will be understood, however, that the "index" limit switch 123 may be closed at a preselected time prior to the completion of the index so that the feed of papers from the paper feeder 10 may be commenced prior to arrival of one of the expansible rolling cages at the infeed position or station whereby the first paper will be immediately in position to enter such cage at the infeed station when same arrives.

The memory circuits 118 and 119 shown in block diagram may be of any of the many conventional forms and as such, forms no part of this invention. However, the concept of employing multiple memory circuits in combination with a multiple rolling cage bundling apparatus and paper and wrapper sheet feeding mechanisms does form an important aspect of the present invention in that the combination enables a plurality of functions to take place simultaneously or in parallel to provide for high speed bundling.

Thus, for example, an operator may be punching up a count at the control position 117 while at the same time papers for a previous count are being fed and a wrapper therefor is being fed and/or glued, and the papers of a still previous count are being bundled and wrapped.

While for the sake of simplicity, a manual impression of the count at position 117 has been described it will be understood that the count may be impressed on the memory circuits electrically for instance through the use of a wrapper label code and a suitable detecting device. Also while the wrapper feeder 13 has been shown as feeding wrapper sheets from a stack 96, it will be understood that any other types of sheet feeding mechanisms may be employed such as those incorporating sheet measuring and cut off devices. Thus, for example, the invention lends itself to bundling with complete automation wherein labels fed from a suitable labelling head bearing in suitable code the requisite bundle count and the address for which the bundle is to be forwarded may be scanned or detected to set the count in one of the multiple memory circuits 118 or 119 and to effect the measurement and cut off of the appropriate sheet size to encircle the bundle and to which the label may be affixed. The memory circuits will of course then take over as above described.

While the particular machine illustrated shows an arrangement with three rolling cages, it will be understood that any number of cages may be employed in the machine.

It will be understood that other variations in the details and structure of the parts and in the arrangement of the bundling set-up may, therefore, be made within the spirit of the invention and without departing from the scope of the appended claims.

What I claim is:

1. Apparatus for bundling a plurality of papers or the like delivered to the apparatus in successive overlapped relation comprising an indexing head, at least two expansible cages for rolling sheet material carried by said head, means for indexing said head to carry said expensible cages between an infeed station and an eject station, means for interrupting movement of said indexing head for a predetermined period with said expansible cages disposed at said infeed and eject stations whereby sheet material is adapted to be delivered into one of the expansible cages at the infeed station to be rolled thereby while rolled sheet material is ejected from the other expansible cage at said eject station.

2. Apparatus for bundling a plurality of papers or the like delivered to the apparatus in successive overlapped relation comprising an indexing head, a plurality of expansible cages for rolling papers or the like carried by said head, means for indexing said head to carry said cages from an infeed station to an eject station, means for interrupting movement of said indexing head for a period dependent upon the number of papers or the like to be bundled, means for feeding papers or the like into said cages when in the infeed station and means for ejecting rolled papers or the like in successive overlapped relation from the cages at the eject station.

3. Apparatus for bundling papers or the like comprising an indexing head, a plurality of expansible paper rolling cages carried by said head, means for indexing said head to move said cages between an infeed station and an eject station with cage transfer being halted at at least one intermediate station between said infeed and eject stations, means for feeding papers arranged in successive overlapped relation into said cages for bundling when at said infeed station, means responsive to the number of papers so fed for bundling for controlling said indexing head to hold a cage at said infeed station to receive the fed papers, means for ejecting rolled papers from said cages at the eject station, and means providing for the fixing of papers rolled by said cages in rolled bundle form prior to ejection.

4. Apparatus for bundling papers or the like comprising an indexing head, at least two expansible cages for rolling papers or the like carried by said head, means for indexing said head to transfer said cages from an infeed station to an eject station, means for feeding papers sequentially in overlapping relation into said cages when at the infeed station, means for feeding a wrapper sheet into said cages at said infeed station following paper feed, means responsive to the number of papers so fed for bundling for controlling said indexing head to hold a cage at said infeed station to receive the fed papers and means for ejecting papers rolled by said cages from said cages when same are transferred to said eject station.

5. Apparatus for bundling papers or the like comprising an indexing head, a plurality of expansible cages for rolling papers or the like into bundle form carried by said head, means for indexing said head between and stopping same at an infeed station and an eject station, means for feeding papers into said cages when at said infeed station, means responsive to the number of papers so fed for bundling for controlling said indexing head to hold a cage at said infeed station to receive the fed papers and means for ejecting papers from said cages at the eject station, the arrangement being such that infeed of papers at the infeed station can be effected simultaneously with the ejection of rolled papers at the eject station.

6. Apparatus as claimed in claim 5 in which means are provided to feed a wrapper sheet into said cages following paper feed whereby said wrapper sheet is rolled by said cages around papers bundled thereby.

7. Apparatus as claimed in claim 6 in which means are provided to apply an adhesive to said wrapper sheets whereby on rolling of said wrapper sheets by said cages, same are fixed in bundle encircling position.

8. Apparatus as claimed in claim 7 in which said indexing head is arranged to be indexed to at least one intermediate station between said infeed and eject stations.

9. Apparatus as claimed in claim 7 in which said paper responsive means comprises a control circuit to automatically effect sequential paper and wrapper infeed and simultaneous bundle ejection, and indexing head indexing following paper and wrapper infeed and bundle ejection.

10. Apparatus as claimed in claim 9 in which said control circuit contains at least one memory circuit for storing a count to subsequently control said paper feeding means to deliver the number of papers to a cage at said infeed position corresponding to the count stored by said memory circuit.

11. Apparatus as claimed in claim 10 in which said control circuit contains at least two such memory circuits.

12. Apparatus as claimed in claim 7 in which said expansible cages are continuously operated to effect rolling of papers fed thereto while away from said eject station.

13. Apparatus as claimed in claim 8 in which said expansible cages each comprise a generally cylindrical grouping of positive driven rollers supported for movement toward and from a central axis and means urging said positively driven rollers toward said central axis.

14. Apparatus as claimed in claim 13 in which a mandrel is rotatably supported centrally of each cylindrical grouping of rollers, and means for driving said mandrel at said infeed station.

15. Apparatus for bundling papers or the like comprising an indexing head, a plurality of expansible paper rolling cages carried by said head, means for indexing said head to transfer said cages from an infeed station to an eject station, and arrest same at said stations means for feeding papers in successive overlapped relation into said cages when same are at said infeed station, means for feeding a wrapping sheet to follow papers delivered into said cages at said infeed station, means for ejecting bundles rolled by said cages when said cages are at said eject station, and a control circuit for controlling said indexing head, said paper feeding and said wrapper feeding means and said bundle ejecting means to effect papers and a wrapping sheet delivery into one cage at an infeed station simultaneously with bundle eject from another cage at said eject station said control circuit including circuit means responsive to the number of papers fed to determine the interval of arrest of said index head between indexing movements.

16. Apparatus as claimed in claim 15 in which said control circuit has at least two memory circuits for storing counts of papers to be fed to the rolling cages when same are at said infeed position, said memory circuits providing for the impressing of a paper count on one memory circuit while said other memory circuits is simultaneously effecting requisite paper feed in response to a previous count stored therein.

17. Apparatus as claimed in claim 15 in which means are provided for applying glue to said wrapper sheets, and said control circuit is arranged to control said glue applying means to effect glue application to said wrappers immediately prior to delivery thereof into said rolling cages.

18. Apparatus for bundling newspapers or the like comprising a plurality of expansible paper rolling cages, means for transferring said rolling cages from an infeed position to an eject position, means for arresting said cages at said infeed and eject positions means for feeding papers in successive overlapped relation into said cages when same are at said infeed position to be bundled thereby, means for ejecting rolled paper bundles from said cages at said eject position, means for delivering a predetermined number of papers to said paper feeding means, means for delivering a wrapper sheet to said paper feeding means immediately subsequent to paper feed to encircle the bundle formed by the cage into which said papers are fed, and a control circuit for controlling said cage transferring means, paper delivering means, paper ejecting means, and wrapper feeding means to effect in parallel operation the infeed of a predetermined number of papers and a wrapper sheet therefor into one of said rolling cages at said infeed position, and the ejection of a wrapped paper bundle from another cage at the eject position, and to effect cage transfer immediately subsequent to said parallel operations to bring following cages to said infeed and inject positions respectively.

19. Apparatus as claimed in claim 18 in which said control circuit includes at least two memory circuits for storing counts of papers to be delivered by said paper delivery means; said memory circuits being arranged to sequentially actuate said control circuit in accordance with the count stored thereby whereby a count may be impressed on one of said memory circuits in a parallel operation with the paralleling operation of paper and wrapper infeed and bundle ejection effected by said control circuit through the other memory circuit.

20. Apparatus as claimed in claim 19 in which means are provided for applying glue to wrapper sheets delivered by said wrapper sheet feeding means, and said control circuit is arranged to control said glue applying means to effect glue application to a wrapper sheet substantially immediately prior to delivery thereof to the rolling cage at the infeed station.

21. Apparatus for bundling newspapers or the like comprising a plurality of paper rolling means, means for indexing said paper rolling means to bring same successively to and arrest same at an infeed station and successively to and arrest same at an eject station, means for feeding a predetermined count of papers arranged in successive overlapped relation into said rolling means at said infeed station to be rolled thereby into a bundle, means for affording the fixing of papers bundled by said rolling means in bundled form, means for ejecting bundled papers from said rolling means at said eject station, and a control circuit for effecting in parallel operation the feeding of papers into one of said rolling means at said infeed station and the ejection of bundled papers from another of said rolling means at said eject station, and the subsequent indexing of said indexing means to bring succeeding rolling means to said infeed and eject stations, said control circuit including circuit means responsive to the number of papers fed to control said indexing means to determine the interval of arrest of said paper rolling means at said infeed station.

22. Apparatus for bundling newspapers or the like comprising a plurality of paper rolling means, means for indexing said paper rolling means to bring same successively to an infeed station and successively to an eject station, means for feeding a predetermined count of papers into said rolling means at said infeed station to be rolled thereby into a bundle, means for affording the fixing of papers bundled by said rolling means in bundled form, means for ejecting bundled papers from said rolling means at said eject station, and a control circuit for effecting in parallel operation the feeding of papers into one of said rolling means at said infeed station and the ejection of bundled papers from another of said rolling means at said eject station, and the subsequent indexing of said indexing means to bring succeeding rolling means to said infeed and eject stations, said control circuit including at least two memory circuits arranged to sequentially control said control circuit whereby a count of papers to be fed to a rolling means at said infeed station may be impressed on and stored by one of the memory circuits in a parallel operation with the actuation of said control circuit to a count previously impressed on and stored by the other memory circuit to effect paper infeed according to said last mentioned count to one of said rolling means at said infeed station and ejection of a rolled bundle from another of said rolling means at said eject station.

23. Apparatus as claimed in claim 22 in which said means for affording the fixing of bundled papers in bundled form comprises aw rapper feeding mechanism for delivering a wrapper sheet into each rolling means at said infeed station immediately subsequently to the count of papers fed therein, and means for applying glue to the wrapper sheet, said wrapper sheet feeding and gluing means being controlled by said control circuit.

24. Apparatus for bundling newspapers or the like comprising a plurality of paper rolling means, means for indexing said paper rolling means to bring same successively to an infeed station and successively to an eject station, means for interrupting said indexing means with said paper rolling means at said infeed and eject stations means for feeding a predetermined count of papers in successive overlapped relation into said rolling means at said infeed station to be rolled thereby into a bundle, means for feeding a wrapper sheet into said rolling means at said infeed station immediately subsequent to the feed of a count of papers into such latter rolling means to encircle the bundle formed by said rolling means, means to apply glue to the wrapper sheet immediately prior to feed into such rolling means whereby said wrapper sheet is adapted to adhere on itself to fix the bundled papers in bundle form, means for ejecting bundled and wrapped papers from said rolling means at said eject station, and a control circuit for effecting in parallel operation the feeding of papers and a glued wrapper sheet into one of said rolling means at said infeed station and the ejection of bundled and wrapped papers from another of said rolling means at said eject station, and the subsequent indexing of said indexing means to bring succeeding rolling means to said infeed and eject stations, said control circuit including circuit means responsive to the number of papers fed into said rolling means at said infeed station to determine the interval of interruption of said indexing means.

25. Apparatus for bundling newspapers or the like comprising a plurality of a paper rolling means, means for indexing said paper rolling means to bring same successively to an infeed station and successively to an eject station, means for feeding a predetermined count of papers into said rolling means at said infeed station to be rolled thereby into a bundle, means for feeding a wrapper sheet into said rolling means at said infeed station immediately subsequent to the feed of a count of papers into such latter rolling means to encircle the bundle formed by said rolling means, means to apply glue to the wrapper sheet immediately prior to feed into such rolling means whereby said wrapper sheet is adapted to adhere on itself to fix the bundled papers in bundle form, means for ejecting bundled and wrapped papers from said rolling means at said eject station, and a control circuit for effecting in parallel operation the feeding of papers and a glued wrapper sheet into one of said rolling means at said infeed station and the ejection of bundled and wrapped papers from another of said rolling means at said eject station, and the subsequent indexing of said indexing means to bring succeeding rolling means to said infeed and eject stations, said control circuit including at least two memory circuits arranged to sequentially control said control circuit whereby a count of papers to be fed to a rolling means at said infeed station may be impressed on and stored by one of said memory circuits in parallel operation with the actuation of said control circuit to a count previously impressed on the other memory circuit.

26. Apparatus as claimed in claim 25 in which said rolling means comprises expansible rolling cages.

27. Apparatus as claimed in claim 26 in which said expansible rolling cages comprise a cylindrical grouping of rollers mounted to move toward and from a central axis, and means biasing said cylindrical grouping of rollers toward said central axis.

28. Apparatus as claimed in claim 27 in which means are provided to drive said rollers in rotation at all times.

29. Apparatus as claimed in claim 28 in which a mandrel is rotatably mounted substantially on the axis of said cylindrical roller grouping forming each cage.

30. Apparatus as claimed in claim 29 in which means are provided to drive said mandrel in rotation at said infeed station.

31. Apparatus as claimed in claim 27 in which means are provided for expanding said expansible rolling cages at said eject station.

32. Apparatus as claimed in claim 31 in which said means for ejecting bundles from said cages comprises a hydraulic ram operable upon expansion of said cages at said eject station.

33. Apparatus for bundling newspapers or the like comprising a plurality of paper rolling means, means for indexing said paper rolling means to bring same successively to an infeed station and successively to an eject station, means for feeding a predetermined count of papers into said rolling means at said infeed station to be rolled thereby into a bundle, means for feeding a wrapper sheet into said rolling means at said infeed station immediately subsequent to the feed of a count of papers into such latter rolling means to encircle the bundle formed by said rolling means, means to apply glue to the wrapper sheet immediately prior to feed into such rolling means whereby said wrapper sheet is adapted to adhere on itself to fix the bundled papers in bundle form, means for ejecting bundled and wrapped papers from said rolling means at said eject station, and a control circuit for effecting in parallel operation the feeding of papers and a glued wrapper sheet into one of said rolling means at said infeed station and the ejection of bundled and wrapped papers from another of said rolling means at said eject station, and the subsequent indexing of said indexing means to bring succeeding roling means to said infeed and eject stations, said wrapper sheet feeding means being provided with means to feed a wrapper sheet to a first storage position, and means to feed a wrapper from said first storage position to a second storage position in preparation of feed to a rolling means arriving at said infeed station, and said means for applying glue is located at said second storage position, said control circuit containing a detector switch for interrupting wrapper feed at said first storage position with a wrapper sheet in said second storage position.

34. Apparatus for bundling papers or the like comprising a plurality of roller elements, means to support said rollers in a generally circular grouping to define a generally cylindrical roller cage, said roller supporting means shiftably supporting said rollers for relative movement whereby said roller cage is expansible, means acting on all of said roller support means to effect expansible movement of said rollers in unison and feed means leading into said expansible roller cage.

35. Apparatus as claimed in claim 34 in which a mandrel is disposed concentrically within said roller cage and means are provided to drive said mandrel at selected times.

36. Apparatus as claimed in claim 34 in which means are provided to positively drive said roller elements.

37. Apparatus for bundling papers or the like comprising a mandrel about which papers are adapted to be rolled, a plurality of rollers generally concentrically disposed around said mandrel, means supporting said rollers for movement towards and from said mandrel, said rollers at all times maintaining a generally cylindrical grouping about said mandrel to form an expansible roller cage, means for driving said rollers throughout expanding movement of said cage, means urging said cage toward a collapsed position to bring said rollers adjacent to said mandrel, means controlling said rollers to move in unison towards and from a cage collapsed position, paper feeding means leading into said cage, means for driving said paper feeding means, said paper feeding means being shiftable to feed papers into said cage at all times generally tangentially to the paper bundle being rolled by said cage, means to expand said cage upon completion of the rolling of a bundle, to retract said rollers in unison from the bundle while the rollers maintain their cylindrical grouping, means for driving said mandrel while papers are being rolled, means for interrupting mandrel feed preparatory to bundle ejection, and means movable axially of said mandrel for ejecting a completed bundle from said cage.

38. Apparatus as claimed in claim 37 in which said roller supporting means comprise a plurality of swingable arms, and cam means are provided to operate on the individual arms to swing said arms in unison upon opening and closing of said cage.

39. Apparatus as claimed in claim 37 in which said paper delivering means comprises a pair of endless conveyors arranged in opposed relation and adapted to receive papers or the like therebetween and means yieldably urging said conveyors relatively toward each other, said conveyors being aranged to discharge within said roller cage.

40. Apparatus as claimed in claim 39 in which the discharge end of said paper delivering means is arranged to provide a roll forming guide means.

41. Apparatus as claimed in claim 21 in which said bundle fixing means is controlled by said control circuit to operate simultaneously with feed of papers at said infeed station and ejection of bundled papers at said eject station.

42. Apparatus as claimed in claim 41 in which said bundle affixing means effects bundle securement at a point intermediate said infeed and eject stations.

References Cited

UNITED STATES PATENTS

| | | | |
|---|---|---|---|
| 486,088 | 11/1892 | Crowell | 53—99 X |
| 2,771,011 | 11/1956 | Zernov | 93—93 |
| 2,877,612 | 3/1959 | Berney | 53—118 |
| 2,962,847 | 12/1960 | Thoele | 53—118 |
| 3,013,367 | 12/1961 | LaSarre | 53—118 X |
| 3,052,073 | 9/1962 | Johansen et al. | 53—118 |

TRAVIS S. McGEHEE, Primary Examiner

U.S. Cl. X.R.

53—118